July 17, 1923.
R. J. BURROWS
WHEEL
Filed Jan. 17, 1920
1,461,888
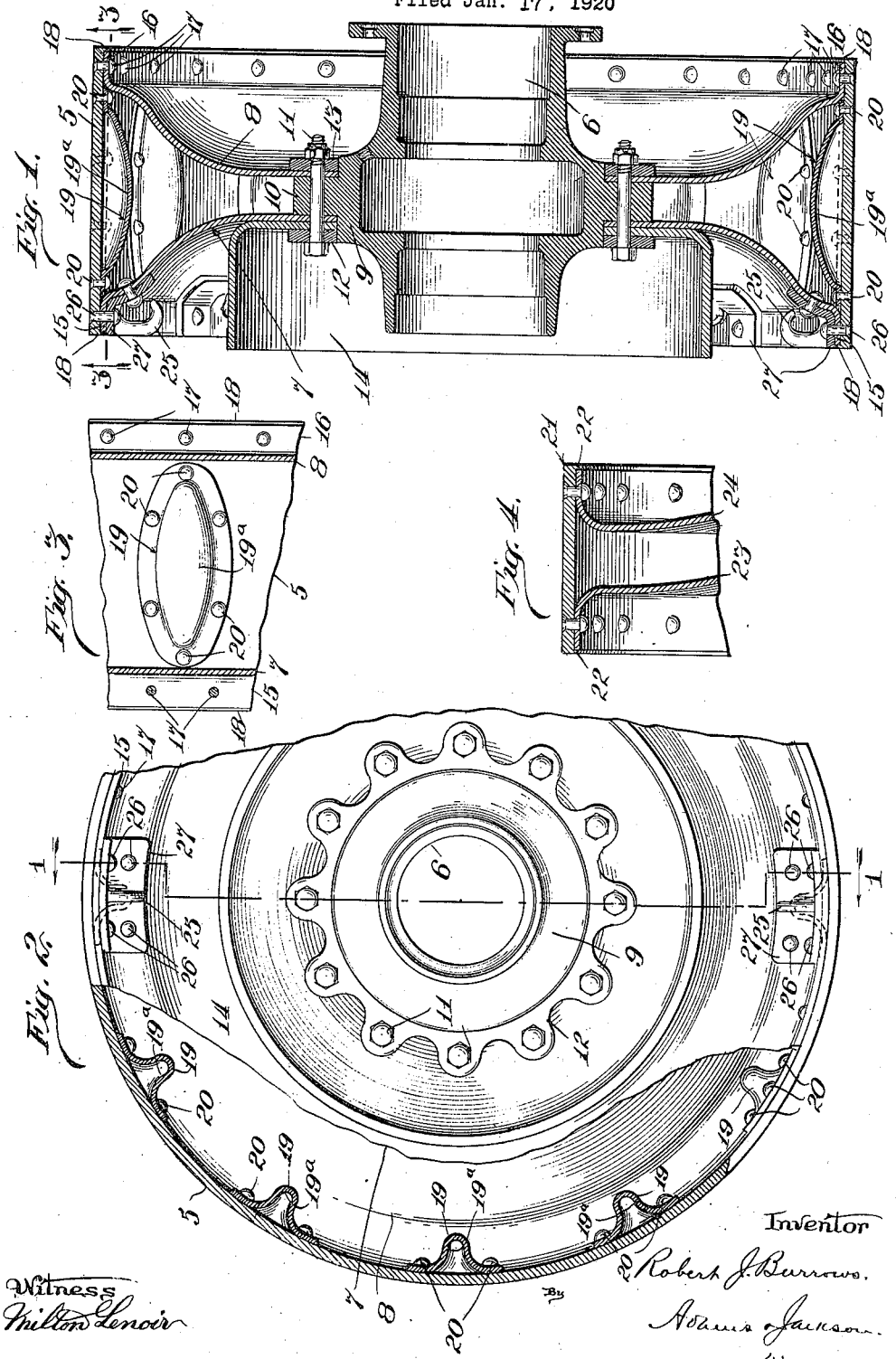

Patented July 17, 1923.

1,461,888

UNITED STATES PATENT OFFICE.

ROBERT J. BURROWS, OF BUCHANAN, MICHIGAN, ASSIGNOR TO CLARK EQUIPMENT COMPANY, OF BUCHANAN, MICHIGAN, A CORPORATION OF MICHIGAN.

WHEEL.

Application filed January 17, 1920. Serial No. 352,070.

*To all whom it may concern:*

Be it known that I, ROBERT J. BURROWS, a citizen of the United States, and a resident of Buchanan, in the county of Berrien and State of Michigan, have invented certain new and useful Improvements in Wheels, of which the following is a specification, reference being had to the accompanying drawings.

My invention relates to vehicle wheels and has for its object to provide a new and improved metal wheel suitable for use on motor vehicles, and particularly automobile trucks.

It consists in certain improved features of construction, which are hereinafter pointed out and are illustrated in the drawings, by which I am able to produce a light and strong wheel which may be manufactured comparatively cheaply. The particular features which I believe to be novel are pointed out in the claims.

In the accompanying drawings,—

Fig. 1 is a vertical section on line 1—1 of Fig. 2 showing my improvements incorporated in a wheel having a brake drum applied thereto to adapt it for use as one of the rear wheels of a motor truck;

Fig. 2 is a side view of my improved wheel, one of the discs being partly broken away, and part of the rim being shown in section;

Fig. 3 is a detail, being a partial horizontal section on line 3—3 of Fig. 1; and Fig. 4 is a sectional detail showing a modification.

Referring to the drawings,—5 indicates the rim of the wheel, and 6 the hub. 7, 8 indicate two similar sheet metal discs, which serves to connect the hub with the rim. These discs are dished, as shown in Fig. 1, and the wheel comprises two of such discs oppositely arranged with their convex surfaces on the inside. The inner margins of the discs fit upon an intermediate or central portion 9 of the hub which is provided with a radial flange 10 against which the discs abut, and to which they are secured by a series of bolts 11. Outside of the discs 7, 8 are mounted collars 12, 13 through which the bolts 11 extend and by which the discs are firmly clamped in position. Where the wheel is to be used as the rear wheel of a vehicle it is also provided with a brake drum 14 at one side thereof, which is clamped between one of the collars 12 or 13 and the adjacent disc 7 or 8, as shown in Fig. 1.

The outer edges of the discs 7, 8 are turned outwardly, as shown at 15, 16 in Fig. 1, so that they are parallel with the rim, against the outer marginal portions of which they bear, as shown in said figure. These flattened edges or marginal flanges of the discs 7, 8 are secured to the rim by rivets 17 in such manner that the outer surface of the rim 5 is left smooth so that if desired an outer rim of any suitable description, such as a demountable tire carrying rim, may be readily applied to the rim 5. The dimensions of the parts are such that when the discs 7, 8 are attached to the rim their outer edges lie slightly within the marginal portions of the rim 5 which are then spun or pressed inwardly to form inwardly-projecting marginal flanges 18 which overlap the outer edges of the discs 7, 8 and abut against them. Thus the flanges 18 serve to hold the discs more firmly and take off all shearing strains on the rivets 17.

For the purpose of reinforcing the rim 5 intermediately so that comparatively light material may be used in its construction, I provide a series of bracing members 19 which extend transversely of the wheel,— that is to say they are arranged longitudinally of its axis,—and are secured to the under surface of the rim independently of the discs 7, 8, there being no direct connection between said bracing members and said discs. These bracing members are best made in the form of elliptical dished plates, as shown in Fig. 1, the marginal portions of said members being flattened to fit against the rim 5 while the central portion thereof is made concavo-convex, as shown at 19ª in Figs. 1 and 2. The members 19 are spaced apart around the wheel, and are secured in place by rivets 20, as best shown in Fig. 3. Thus they serve as trusses to strengthen and sustain the intermediate portion of the wheel rim.

In Fig. 4 I have illustrated certain features of my present invention applied to a simpler form of wheel in which the members 19 are not employed, as I wish it to be clearly understood that the manner of securing the discs to the wheel rim hereinbefore described may be employed in wheels of other design than that shown in Fig. 1. In the construction shown in Fig. 4, the wheel rim 21 has marginal flanges 22 corresponding with the marginal flanges 18 previously described, and the rim is connected with the hub by discs 23, 24, but said discs are not precisely alike, as is the case with the discs 7, 8. The discs 23, 24 are similarly dished, but the outer edge of the disc 23 is bent oppositely to the outer edge of the disc 24, so that when the two discs are in position their dished portions are substantially parallel with each other instead of being oppositely arranged as in the manner shown in Fig. 1. The arrangement shown in Fig. 4 illustrates one of a number of ways in which my improved construction for securing the discs to the rim may be applied.

In the construction shown in Figs. 1 and 2 I have shown the wheel as being equipped with a series of marginal hooks 25 for the attachment to the wheel of cross-chains to prevent skidding. For the sake of clearness these hooks are shown at one side of the wheel only, but it will be understood that when used they are provided at both sides. They are secured both to the discs 7, 8 and to the wheel rim by rivets 26 which pass through base plates 27 with which the hooks are provided, as clearly shown in Figs. 1 and 2.

What I claim as my invention and desire to secure by Letters Patent, is—

1. A metal wheel comprising a rim, a hub, discs connected with the hub and with the marginal portions of the rim, and reinforcing members independent of said discs and secured to the inner surface of the rim in spaced relation to each other.

2. A metal wheel comprising a rim, a hub, discs connected with the hub and having their outer edges turned outwardly and secured to the marginal portions of the rim, and reinforcing members independent of said discs and secured to the inner surface of the rim in spaced relation to each other.

3. A metal wheel comprising a rim, a hub, discs connected with the hub and with the marginal portions of the rim, and transversely disposed dished reinforcing members independent of said discs and secured to the inner surface of the rim in spaced relation to each other.

4. A metal wheel comprising a rim, a hub, discs connected with the hub and with the marginal portions of the rim, and transversely disposed elliptical dished reinforcing members independent of said discs and secured to the inner surface of the rim in spaced relation to each other.

ROBERT J. BURROWS.